US012769679B2

(12) United States Patent
Jang et al.

(10) Patent No.: US 12,769,679 B2
(45) Date of Patent: Oct. 20, 2026

(54) PREAMBLE DATA ALIGNMENT FOR CONSTANT LATENCY

(71) Applicant: MACOM Technology Solutions Holdings, Inc., Lowell, MA (US)

(72) Inventors: Jinkyu Jang, Yongin-si (KR); Hyunbae Jin, Seoul (KR); Ilhyun Cho, Yongin-si (KR); Kwangseok Han, Seongnam-si (KR)

(73) Assignee: MACOM TECHNOLOGY SOLUTIONS HOLDINGS, INC., Lowell, MA (US)

( * ) Notice: Subject to any disclaimer, the term of this patent is extended or adjusted under 35 U.S.C. 154(b) by 0 days.

(21) Appl. No.: 18/799,530

(22) Filed: Aug. 9, 2024

(65) Prior Publication Data

US 2026/0044463 A1 Feb. 12, 2026

(51) Int. Cl.
*G06F 13/20* (2006.01)
*G06F 1/04* (2006.01)
*G06F 13/38* (2006.01)

(52) U.S. Cl.
CPC .......... *G06F 13/20* (2013.01); *G06F 2213/40* (2013.01)

(58) Field of Classification Search
CPC .............................. G11C 7/1093; H04L 27/20
See application file for complete search history.

(56) References Cited

U.S. PATENT DOCUMENTS 12,034,447 B2 * 7/2024 Gharibdoust ....... H03M 1/1255
2001/0014922 A1 * 8/2001 Kuge .................. G06F 13/4239 710/36
2005/0032483 A1 * 2/2005 Klomsdorf .............. H04L 27/20 455/110
2005/0265181 A1 * 12/2005 Yen ....................... H04L 7/0037 369/59.19
2011/0026293 A1 * 2/2011 Riho ....................... H01L 25/18 365/63
2023/0377621 A1 * 11/2023 Lee ...................... G11C 7/1093

* cited by examiner

*Primary Examiner* — Getente A Yimer
(74) *Attorney, Agent, or Firm* — Perilla Knox & Hildebrandt LLP; James J. Rha

(57) ABSTRACT

Aspects of a data sink for aligning data between a source and a sink are described herein. An example data sink includes timing circuitry configured to generate an output clock signal, the output clock signal having a variable phase based at least in part on receipt of a reference clock signal, and where the reference clock signal is transmitted from a source. The data sink further includes a verification module configured to receive a data synchronization pattern, the received data synchronization pattern including a sequence of bits that is positionally shifted based at least in part on the variable phase. The verification module is further configured to determine a shift quantity to be removed from incoming data for training a first data bus, the shift quantity determined based on the sequence of bits that is positionally shifted.

20 Claims, 6 Drawing Sheets

500

| | Case 1 CA0 | Case 1 CA1 | Case 2 CA0 | Case 2 CA1 | Case 3 CA0 | Case 3 CA1 | Case 4 CA0 | Case 4 CA1 | Case 5 CA0 | Case 5 CA1 | Case 6 CA0 | Case 6 CA1 | Case 7 CA0 | Case 7 CA1 | Case 8 CA0 | Case 8 CA1 |
|---|---|---|---|---|---|---|---|---|---|---|---|---|---|---|---|---|
| 15 | 1 | 0 | 0 | 0 | 0 | 0 | 0 | 0 | 0 | 0 | 1 | 0 | 1 | 0 | 1 | 0 |
| 14 | 1 | 0 | 1 | 0 | 0 | 0 | 0 | 0 | 0 | 0 | 0 | 0 | 1 | 0 | 1 | 0 |
| 13 | 1 | 0 | 1 | 0 | 1 | 0 | 0 | 0 | 0 | 0 | 0 | 0 | 0 | 0 | 1 | 0 |
| 12 | 1 | 0 | 1 | 0 | 1 | 0 | 1 | 0 | 0 | 0 | 0 | 0 | 0 | 0 | 0 | 0 |
| 11 | 0 | 0 | 1 | 0 | 1 | 0 | 1 | 0 | 1 | 0 | 0 | 0 | 0 | 0 | 0 | 0 |
| 10 | 0 | 0 | 0 | 0 | 1 | 0 | 1 | 0 | 1 | 0 | 1 | 0 | 0 | 0 | 0 | 0 |
| 9 | 0 | 0 | 0 | 0 | 0 | 0 | 1 | 0 | 1 | 0 | 1 | 0 | 1 | 0 | 0 | 0 |
| 8 | 0 | 0 | 0 | 0 | 0 | 0 | 0 | 0 | 1 | 0 | 1 | 0 | 1 | 0 | 1 | 0 |
| 7 | 1 | 0 | 0 | 0 | 0 | 0 | 0 | 0 | 0 | 0 | 1 | 0 | 1 | 0 | 1 | 0 |
| 6 | 1 | 0 | 1 | 0 | 0 | 0 | 0 | 0 | 0 | 0 | 0 | 0 | 1 | 0 | 1 | 0 |
| 5 | 1 | 0 | 1 | 0 | 1 | 0 | 0 | 0 | 0 | 0 | 0 | 0 | 0 | 0 | 1 | 0 |
| 4 | 1 | 0 | 1 | 0 | 1 | 0 | 1 | 0 | 0 | 0 | 0 | 0 | 0 | | 0 | 0 |
| 3 | 0 | 0 | 1 | 0 | 1 | 0 | 1 | 0 | 1 | 0 | 0 | 0 | 0 | 0 | 0 | 0 |
| 2 | 0 | 0 | 0 | 0 | 1 | 0 | 1 | 0 | 1 | 0 | 1 | 0 | 0 | 0 | 0 | 0 |
| 1 | 0 | 0 | 0 | 0 | 0 | 0 | 1 | 0 | 1 | 0 | 1 | 0 | 1 | 0 | 0 | 0 |
| 0 | 0 | 0 | 0 | 0 | 0 | 0 | 0 | 0 | 1 | 0 | 1 | 0 | 1 | 0 | 1 | 0 |
| | CA shift 0 | | CA shift 1 | | CA shift 2 | | CA shift 3 | | CA shift 0 | | CA shift 1 | | CA shift 2 | | CA shift 3 | |

490

FIG. 5

PREAMBLE DATA ALIGNMENT FOR CONSTANT LATENCY

BACKGROUND

Memory devices are being designed to meet increasing demands for higher bandwidth and data transfer rates as compared to prior generations for graphics and computing applications. New memory devices support high bandwidth and reliable data transfer for use in applications such as graphics cards, game consoles, and other high-performance computing applications. In a memory device, various bus lanes can be used to receive and return data.

SUMMARY

Certain aspects of the concepts and embodiments described herein are summarized below. The aspects are representative and not exhaustively listed. In alternate embodiments, certain features and elements can be added, omitted, and interchanged with each other. Additionally, variations, extensions, and modifications to the example embodiments can be achieved by those skilled in the art without departing from the concepts, so as to encompass equivalent and related structures.

Aspects of a data sink for aligning data between a source and a sink are described herein. An example data sink includes timing circuitry configured to generate an output clock signal, the output clock signal having a variable phase based at least in part on receipt of a reference clock signal, and where the reference clock signal is transmitted from a source. The data sink further includes a verification module configured to receive a data synchronization pattern, the received data synchronization pattern including a sequence of bits that is positionally shifted based at least in part on the variable phase. The verification module is further configured to determine a shift quantity to be removed from incoming data for training a first data bus, the shift quantity determined based on the sequence of bits that is positionally shifted.

Aspects of a system for aligning data between a source and a sink are described herein. An example system includes a sink and a source configured to generate a reference clock signal. The sink includes a verification module and timing circuitry configured to generate an output clock signal based at least in part on receipt of the reference clock signal. The verification module is configured to receive a data synchronization pattern where the received data synchronization pattern includes a sequence of bits that is positionally shifted based at least in part on a phase of the output clock signal. The verification module is further configured to determine a shift quantity to be removed from incoming data for training a first data bus, where the shift quantity is determined based on the sequence of bits that is positionally shifted.

Another example system includes timing circuitry configured to generate an output clock signal, the output clock signal having a variable phase. The system further includes a verification module configured to receive a data synchronization pattern, the received data synchronization pattern including a sequence of bits that is positionally shifted based at least in part on the variable phase. The verification module is further configured to determine a shift quantity to be removed from incoming data for training a first data bus, the shift quantity being determined based on the sequence of bits that is positionally shifted. The system further includes a first delay adjustment module configured to receive the incoming data via the first data bus, the incoming data including a positionally shifted data sample that is positionally shifted based at least in part on the phase of the output clock signal. The first delay adjustment module is further configured to remove an unwanted positional shift from the positionally shifted data sample based on the determined shift quantity and generate a position-shift removed sequence of bits. The system further includes a data processing unit configured to receive and map the position-shift removed sequence of bits to a second data bus and generate a return data set based on the mapping, the return data set including a time shifted return data set. The system further includes a second delay adjustment module configured to remove an unwanted time shift from the time shifted return data set based on the determined shift quantity, generate a time-shift removed return data set, and transmit the time-shift removed return data set back to the source via the second data bus.

BRIEF DESCRIPTION OF THE DRAWINGS

Aspects of the present disclosure can be better understood with reference to the following drawings. It is noted that the elements in the drawings are not necessarily drawn to scale, with emphasis instead being placed upon illustrating the principles of the examples. In the drawings, like reference numerals designate like or corresponding, but not necessarily the same, elements throughout the several views.

FIG. 5 depicts example tables corresponding to sequences of bits of the data synchronization pattern shown in FIG. 4 according to one or more embodiments of the present disclosure.

DETAILED DESCRIPTION

Figure 1:
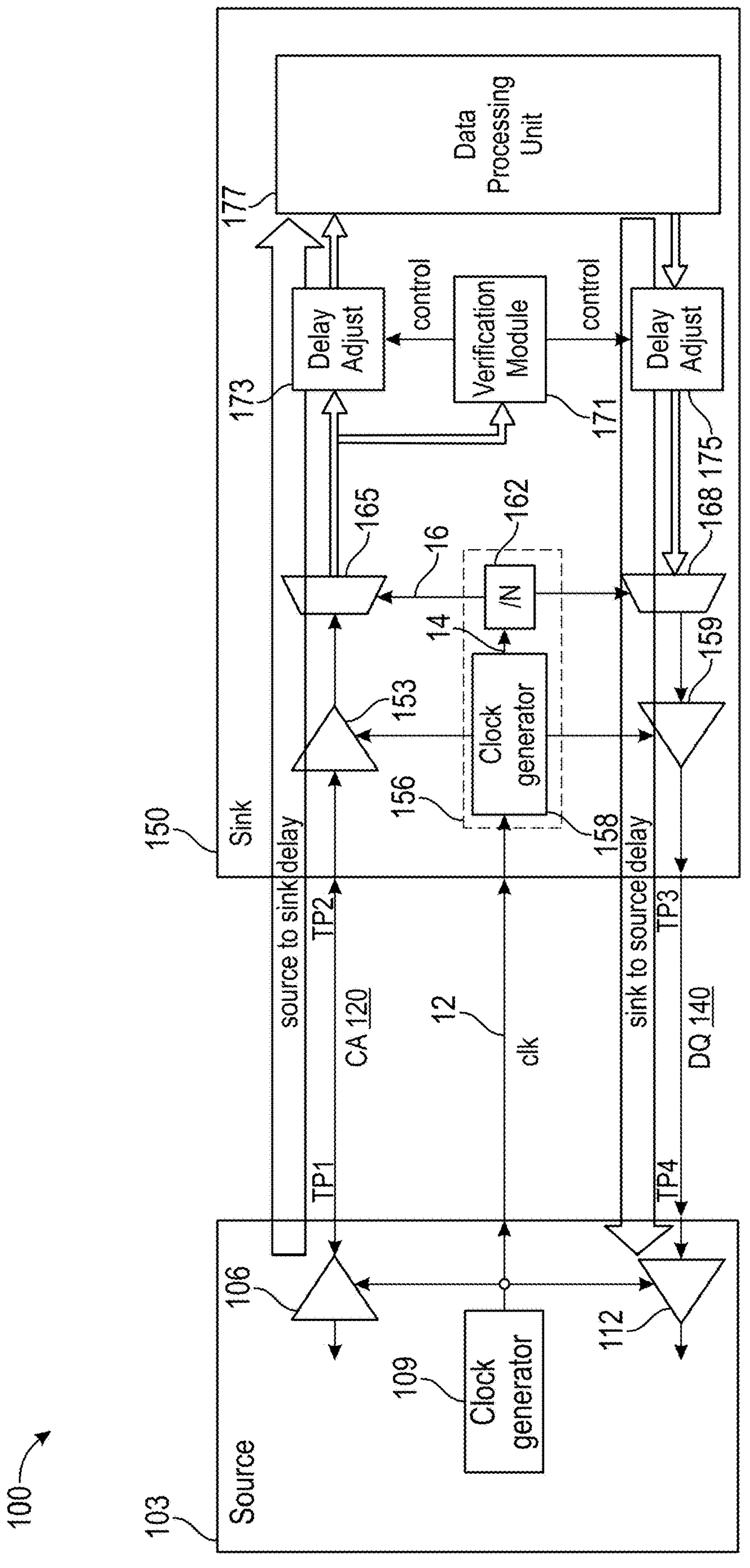
FIG. 1 depicts a block diagram of an example system for mapping data with data alignment according to one or more embodiments of the present disclosure.

Memory devices are being designed to meet increasing demands for higher bandwidth and data transfer rates as compared to prior generations for graphics and computing applications. For example, memory devices designed today need to be able to support high bandwidth and reliable data transfer for use in applications such as graphics cards, game consoles, and other high-performance computing applications. In a memory device, various bus lanes can be used to receive and return data. However, the receipt and return of data by the memory device can be prone to alignment issues, which can cause reliability issues for the memory device.

Graphics double data rate (GDDR) memory is a type of memory designed for graphics processor units (GPUs) and provides high bandwidth, low latency, and efficiency. GDDR memory has a high bandwidth "double data rate" interface and is designed for use in graphics cards, game consoles, and other high-performance computing applications. GDDR memory devices can include various data buses and data lanes to receive data from and return data to a source, such as a memory controller. A GDDR memory device (e.g., configured as a sink) can include a command address (CA) bus for receiving command data, address data, a combination of command and address data, and related data from a source. Command data can include, for example, read commands, write commands, refresh commands, and other types of commands. Address data can include row addresses, column addresses, bank addresses, and other types of addresses. A GDDR7 memory device or other GDDR memory devices can also include a data queue (DQ) bus for transferring data between the memory device and the source. Data sent via the DQ bus can include read data, write data, and status data, among other types of data.

For the transmission of data between the memory device and the source to be correctly interpreted, the CA bus may require proper training for data alignment between the sink and the source. CA bus training can help to ensure that command and address signals sent from the source are correctly received and interpreted by the sink. This process may include adjusting timing parameters to account for variations in signal transmission and reception, to ensure reliable communication.

Conventional CA bus training techniques often face challenges because the exact phase of an internal clock for the sink is not always ascertainable, among other challenges. For example, a sink can include a phase-locked loop (PLL) clock generator. The PLL clock generator in the sink can generate an output clock signal locked to a reference clock signal originating from a source. The output clock signal can be subject to phase variations as compared to the reference clock signal. These phase variations can lead to latency variations for data communication between the source and the sink, making accurate data sampling difficult for training the CA bus. The variations can also lead to misalignment of data sent from the source and received by the sink and data that is output by the sink and returned to the source.

One or more embodiments of the present disclosure include a system for mapping data in a memory device. The system can include a source including a clock generator and a sink including timing circuitry and a verification module. The timing circuitry can be configured to generate an output clock signal based at least in part on receipt of an input or reference clock signal transmitted from the clock generator, where the output clock signal is different from the input clock signal. The verification module can be configured to receive a data synchronization pattern transmitted from the source, where the received data synchronization pattern includes a sequence of bits that is positionally shifted based at least in part on a phase of the output clock signal. The verification module can be further configured to determine a quantity of the positional shift to apply to a training pattern data sample for training a first data bus for data alignment between the source and the sink.

Referring now to the drawings, FIG. 1 depicts a block diagram of an example system 100 for mapping data with data alignment according to one or more embodiments of the present disclosure. The system 100 is not exhaustively illustrated, meaning that other components not shown in FIG. 1 can be included or relied upon in some cases. Similarly, one or more components shown in FIG. 1 can be omitted in some cases.

The system 100 includes a source 103 in data communication with a sink 150 via a column address or CA bus 120 and a data or DQ bus 140, among possibly other components. The CA bus 120, the DQ bus 140, and other address, data, and control signals are electrically coupled between the source 103 and the sink 150. As examples, the source 103 can be embodied as a memory controller, such as a memory controller for graphics processing units (GPUs), central processing units (CPUs), or related controller. The sink 150 can be embodied as one or more memory devices, such as GDDR memory devices. Example GDDR memory devices can include, for example, GDDR5 memory devices, GDDR6 memory devices, GDDR6X memory devices, and GDDR7 memory devices. The concepts described herein are not limited to use with controllers and graphics memory devices (e.g., GDDR memory devices), however, as the concepts can be applied to a range of different systems and devices. Overall, the source 103 and the sink 105 can be embodied as other types of devices beyond memory controllers and GDDR memory devices.

The source 103 includes a clock generator 109 and buffers 106 and 112, among possibly other circuit components or modules. The source 103 can be configured to send data to and receive data from the sink 150 as described below. The sink 150 includes circuit modules to facilitate receipt of data from the source 103 and transmission of data back to the source 103. The sink 150 includes timing circuitry 156, buffers 153 and 159, demultiplexers 165 and 168, a verification module 171, a first delay adjustment module 173, a second delay adjustment module 175, and a data processing unit 177, among possibly other components.

The timing circuitry 156 includes a clock generator 158 and a clock divider 162. The clock generator 158 can include a PLL clock generator, as one example, and other types of clock generators can be relied upon. The clock generator 158 is configured to receive a reference clock signal 12 generated by and transmitted from the clock generator 109 in the source 103. The clock generator 158 is also configured to generate a input clock signal 14 based on the reference clock signal 12 from the source 103. The reference clock signal 12 is used as a reference clock signal for the system 100, and the input clock signal 14 can be locked in frequency, phase, or both frequency and phase to the reference clock signal 12. The clock divider 162 can be configured to generate an output clock signal 16 for transmission to the demultiplexers 165 and 168.

The sink 150 can be configured to receive training data from the source 103. The training data can be relied upon for evaluating and training the CA bus 120, to ensure that command and address signals are correctly synchronized and timed between the source 103 and the sink 150. The training data can include one or more CA training patterns, for example, and the training patterns can help to calibrate timing parameters at the sink 150. The timing parameters can be calibrated to ensure reliable communication and data integrity for high-speed memory operations for the system 100, facilitating data alignment between the source 103 and the sink 150.

One issue for the training process of the CA bus 120 is that the output clock signal 16 can have a phase variation based on a positioning of the lock of the input clock signal 14 to the reference clock signal 12. In other words, based on where the lock (e.g., the phase position lock) of the input clock signal 14 is relative to the reference clock signal 12, the output clock signal 16 can have a phase variation with respect to the reference clock signal 12. It can be difficult to ascertain in that case where rising and falling edges of the output clock signal 16 occur in that case. The phase variations for the output clock signal 16 can cause unwanted latency between the source 103 and the sink 150, among other issues, and training data sent by the source 103 to the sink 150 may not be returned back to the source 103 in the manner expected by the source 103. The phase variations can also cause unwanted latency and data communication errors in other types of data beyond training data.

In one operating scenario, the sink 150 can be configured to receive training data from the source 103 via one or more CA lanes among all the CA lanes of the CA bus 120. This training can correspond to aligning the timing of the command and address signals between the source 103 and the sink 150 and facilitate accurate data communication between the source 103 and the sink 150. The sink 150 can be configured to receive the training data from the source 103 via the CA bus 120, map the training data to the DQ bus 140, and return the mapped training data to the source 103 via one or more DQ lanes among all the DQ lanes of the DQ bus 140. In some cases, the mapped training data that is returned to the source 103 may not be correctly synchronized and/or timed, as compared to the training data sent by source 103 and received by the sink 150. This training process and problems associated with the training process are described in greater detail below.

Figure 2:
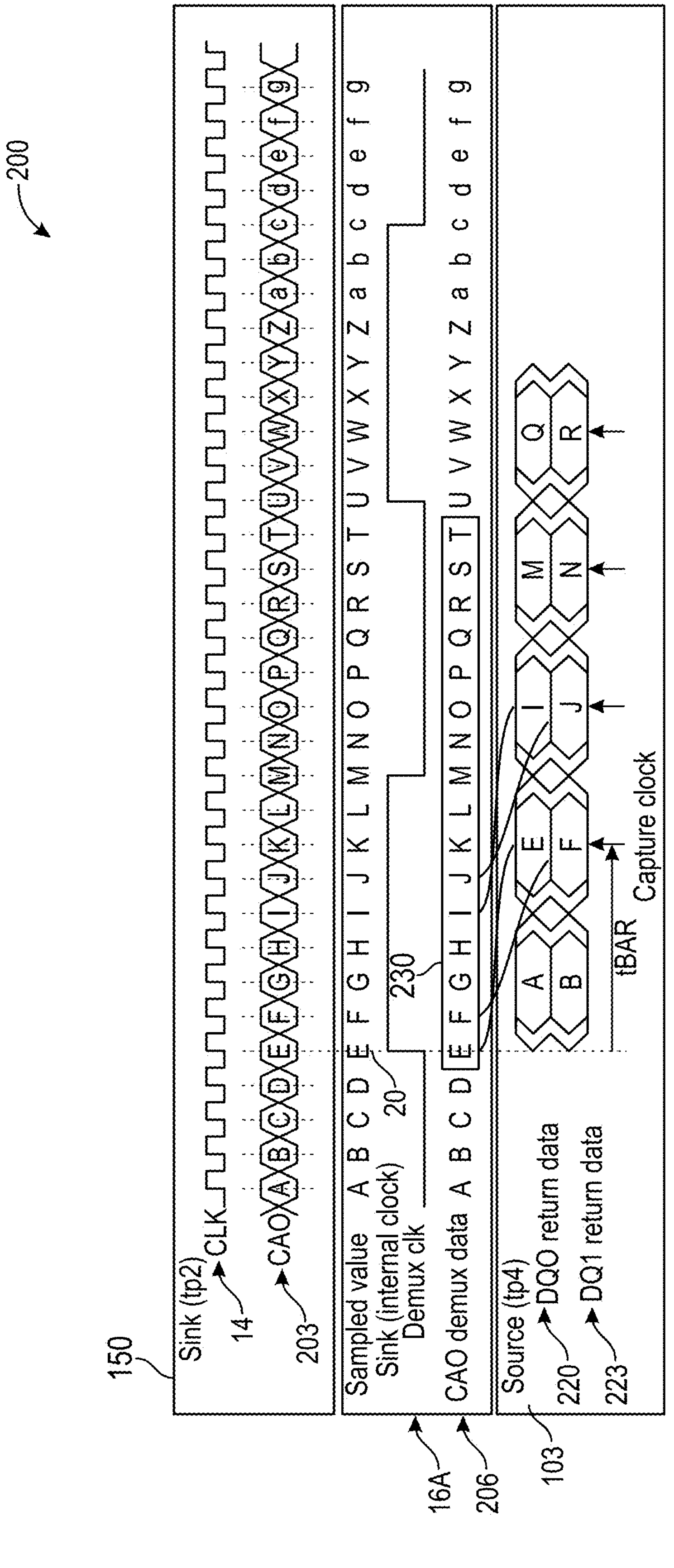
FIG. 2 depicts example waveforms for a training process of a data bus of the system shown in FIG. 1, without unwanted phase shift of an output clock signal, according to one or more embodiments of the present disclosure.

FIG. 2 depicts example waveforms 200 for a training process of a data bus of the system 100, without unwanted phase shift of the output clock signal 16, according to one or more embodiments of the present disclosure. As discussed above, the sink 150 can be configured to receive training data from the source 103. Referring to FIG. 2, the sink 150 can be configured to receive input training data 203 from the source 103 via the CA bus 120. The input training data 203 can be received via a first CA lane (e.g., "CA0") among the CA lanes of the CA bus 120. The input training data 203 can be initially received via the buffer 153. The input training data 203 can be communicated from the buffer 153 to the demultiplexer 165 and to the data processing unit 177, in turn, as shown in FIG. 1. The operation of the delay adjustment modules 173 and 176 and the verification module 171 can be ignored in this example but are discussed in detail below.

The input training data 203 includes a sequence of bits of predefined unit intervals (UIs). In some examples, the sequence of bits can extend between a length of 20 UIs and 40 UIs, although other lengths of the input training data 203 can be relied upon. In two examples, the sequence of bits can be 8 bits corresponding to eight UIs and preferably 16 bits corresponding to 16 UIs. The sequence of bits can be a toggle signal that toggles between four 0's and four 1's in one particular example.

The input training data 203 received by the sink 150 is synchronized with the input clock signal 14, which is locked to the reference clock signal 12. After the input training data 203 is passed through the demultiplexer 165, the data processing unit 177 is configured to receive sampled training data 206, which is a sampled version of the input training data 203. The sampled training data 206 includes a sequence of bits 230 sampled from the input training data 203 based on a particular phase 16A of the output clock signal 16 (also "output clock signal 16A"). As discussed previously, the phase of the output clock signal 16 can vary based on where a lock of the input clock signal 14 occurs relative to the reference clock signal 12. In the example shown in FIG. 2, there is no unwanted phase shift of the output clock signal 16A as compared to reference point 20 (e.g., the rising edge of the output clock signal 16A starts at the reference point 20), and the sampled training data 206 is sampled correctly based on the input training data 203. As such, the sequence of bits 230 includes a correct sequence of bits. The reference point 20 is provided for exemplary purposes, and the positioning of the reference point 20 can be adjusted. For example, instead of the reference point 20 being set to the current position (e.g., the position of the bit "E" in the input training data 203 and the sequence of bits 230), the reference point 20 can be set to other positions such as the position of the bit "F," "G," "H," etc.

The data processing unit 177, which can include a data decoder, encoder, or other data processing circuitry, is configured to map the sequence of bits 230 to the DQ bus 140. For example, the data processing unit 177 can be configured to map the sequence of bits 230 to a first DQ lane ("DQ0") and a second DQ lane ("DQ1"), resulting in a mapping at a 1:2 ratio of the data from the CA0 lane to the DQ0 and DQ1 lanes. For example, a first bit "E" of the sequence of bits 230, which can be 0 or 1, is sampled and mapped to the first DQ lane, and a second bit "F," which be a 0 or 1, is sampled and mapped to the second DQ lane. The data processing unit 177 can be configured to discard the third and fourth bits (e.g., "G" and "H") and map the fifth and six bits (e.g., "I" and "J") to the first DQ lane and the second DQ lane, respectively. This mapping process can be repeated until the entire sequence of bits 230 has been mapped to the first and the second DQ lanes, as described, causing the data processing unit 177 to generate a first return data set 220 ("DQ0 return data") and a second return data set 223 ("DQ1 return data").

When the sequence of bits 230 is mapped to the first and second DQ lanes as described above, each mapped bit is stretched to four UIs from one UI in the return data sets 220 and 223. For example, the first bit "E" corresponding to one bit of one UI in the sampled training data 206 is stretched to four UIs during the mapping process in the first return data set 220. Similarly, the other bits (e.g., "F," "I," "J," etc.) are each stretched to four UIs in the first return data set 220 or the second return data set 223. The data processing unit 177 is configured to return the first return data set 220 and the second return data set 223 back to the source 103 via the demultiplexer 168 and the buffers 159 and 112 as depicted in FIG. 1. In the example depicted in FIG. 2, the output clock signal 16A does not have an unwanted phase shift relative to the reference point 20. In other words, the rising edge of the output clock signal 16A is not time shifted relative to the reference point 20.

Figure 3:
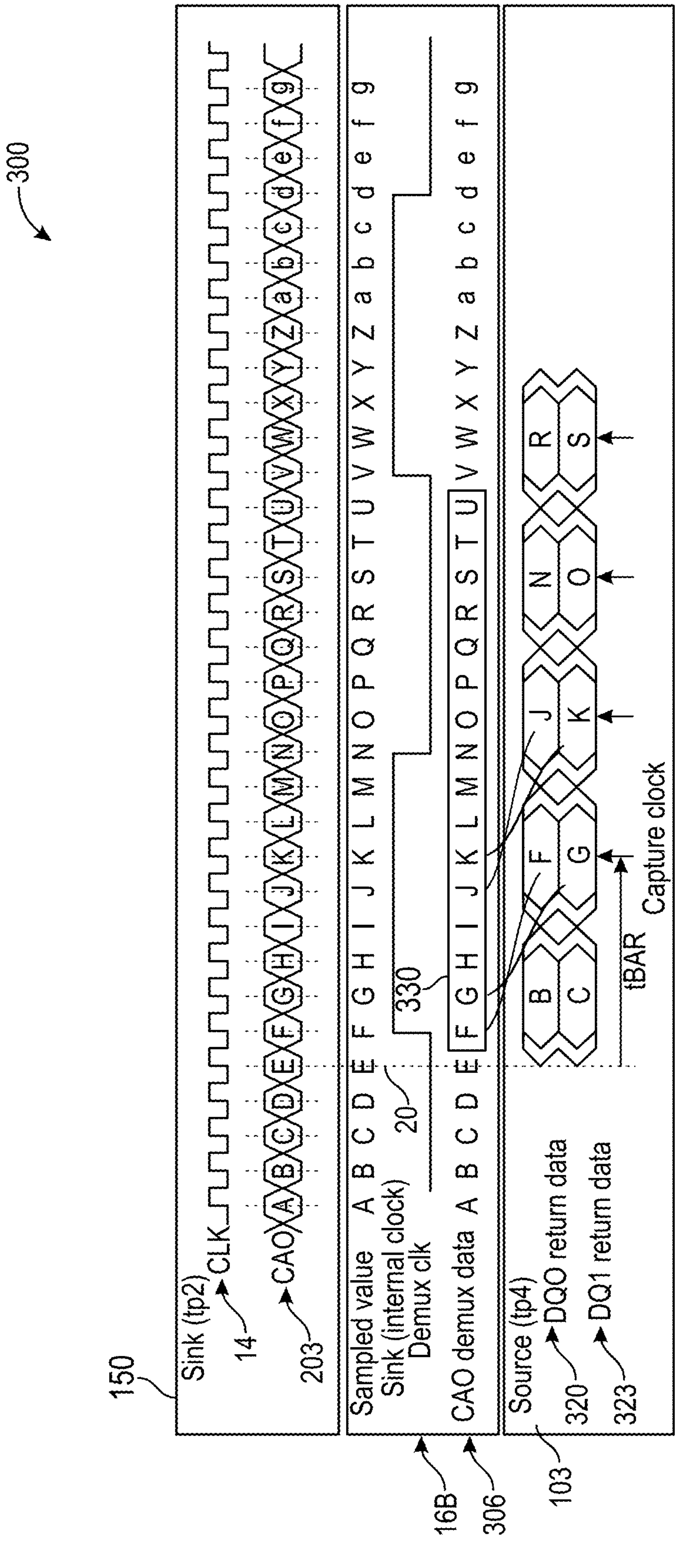
FIG. 3 depicts example waveforms for a training process of a data bus of the system shown in FIG. 1, with an unwanted phase shift of the output clock signal, according to one or more embodiments of the present disclosure.

FIG. 3 depicts example waveforms 300 for a training process of a data bus of the system 100 with an unwanted phase shift of the output clock signal 16 according to one or more embodiments of the present disclosure. The training process depicted by the waveform 300 is similar to the training process described above with reference to FIG. 2. Compared to the output clock signal 16A depicted in FIG. 2, output clock signal 16B is time shifted one UI to the right. That is, the first rising edge of the output clock signal 16B occurs at a later instance of time as compared to that of the output clock signal 16A relative to the reference point 20.

The time or phase shift of the output clock signal 16B can vary and is based on where the lock of the input clock signal 14 occurs relative to the reference clock signal 12. The extent of the phase shift of the output clock signal 16B can vary and is difficult to ascertain in a repeatable or expected way. For example, the output clock signal 16 can be shifted one UI to the right as depicted by the output clock signal 16B shown in FIG. 3, two UIs to the right, three UIs to the right, four UIs to the right, etc., relative to the reference point 20.

Due to the phase shift of the output clock signal 16B by one UI to the right in the example shown, the sampled training data 306 is sampled from the input training data 203 one UI to the right as compared to the sampled training data 206. For example, the sampled training data 306 includes a sequence of bits 330 that is positionally shifted one unit to the right as compared to the sequence of bits 230 of the sampled training data 206. As such, the sequence of bits 330 includes sampled bits from "F" to "U" from the input training data 203 rather than from "E" to "T," which was the case for the sequence of bits 230 shown in FIG. 2. As compared to the sequence of bits 230 shown in FIG. 2, starting with the first bit, each individual bit in the sequence of bits 330 is shifted one unit to right in the example shown in FIG. 3.

Similar to the mapping of the sequence of bits 230 to the DQ data bus 140, the data processing unit 177 can be configured to map the sequence of bits 330 to the DQ data bus 140 via the first DQ lane and the second DQ lane. For example, bits "F" and "G" are mapped to the first DQ lane and the second DQ lane, respectively, instead of "E" and "F" as compared to the first return data set 220 and the second return data set 223. The data processing unit 177 can be configured to discard the third and fourth bits (e.g., "H" and "I") and map the fifth and six bits (e.g., "J" and "K") to the first DQ bus and the second DQ lane, respectively. This mapping process can be repeated until the entire sequence of bits 330 has been mapped to the first and the second DQ lanes. When the sequence of bits 330 is mapped to the first and second DQ lanes, each mapped bit is stretched to four UI from one UI in the return data sets 320 and 323. For example, the first bit "F" corresponding to one bit of 1 UI in the sequence of bits 330 is stretched to four UIs during the mapping process in the first return data set 320. Similarly, the other bits (e.g., "G," "J," "K," etc.) are each stretched to four UIs in the first return data set 320 or the second return data set 323.

Due to the phase shift of the output clock signal 16B, the first return data 320 and the second return data set 323 are generated with a time shift of one UI as compared to the first return data set 220 and the second return data set 223, relative to the reference point 20. Thus, the return data sets 320 and 323 in FIG. 3 extend between bits "J" and "Z" of the input training data 203, while the return data sets 220 and 223 in FIG. 2 extend between bits "I" and "Y" of the input training data 203. This time shift of the return data sets 320 and 323 as compared to the return data sets 220 and 223 can be attributed to the shift of the phase of the output clock signal 16B of one UI to the right as compared to the output clock signal 16A relative to the reference point 20. The time shift of the return data sets 320 and 323 can cause the return data sets 320 and 323 to be transmitted to the source 103 one UI earlier or later than expected.

If the phase of the output clock signal 16B is shifted by more than one UI to the right (e.g., from the reference point 20), then each individual bit of the sequence of bits 330 can be expected to be positionally shifted by the same amount. Additionally, the return data sets 320 and 323 can be expected to be time shifted by the same amount and transmitted to the source 103 earlier or later than expected. To give another example, if the phase of the output clock signal 16B were shifted by three UI to the right as compared to the phase of the output clock signal 16A, relative to the reference point 20, then the sampled sequence of bits 330 would range from bit "H" to bit "W," and the return data sets 320 and 323 would be configured to first map bits "H" and "I," discard "J" and "K," map bits "L" and "M," discard bits "N" and "O," map bits "P" and "Q," discard bits "R" and "S," map bits "T" and "U," and discard bits "V" and "W." Additionally, the return data sets 320 and 323 would be transmitted three UIs earlier or later to the source 103 than the return data sets 220 and 223.

To address the issues described above, a data synchronization or preamble pattern can be used to identify unwanted phase shifts of the output clock signal 16 and account for such unwanted variations in the phase of the output clock signal 16. Other circuitry can be relied upon to mitigate and correct data mapping issues.

Figure 4:
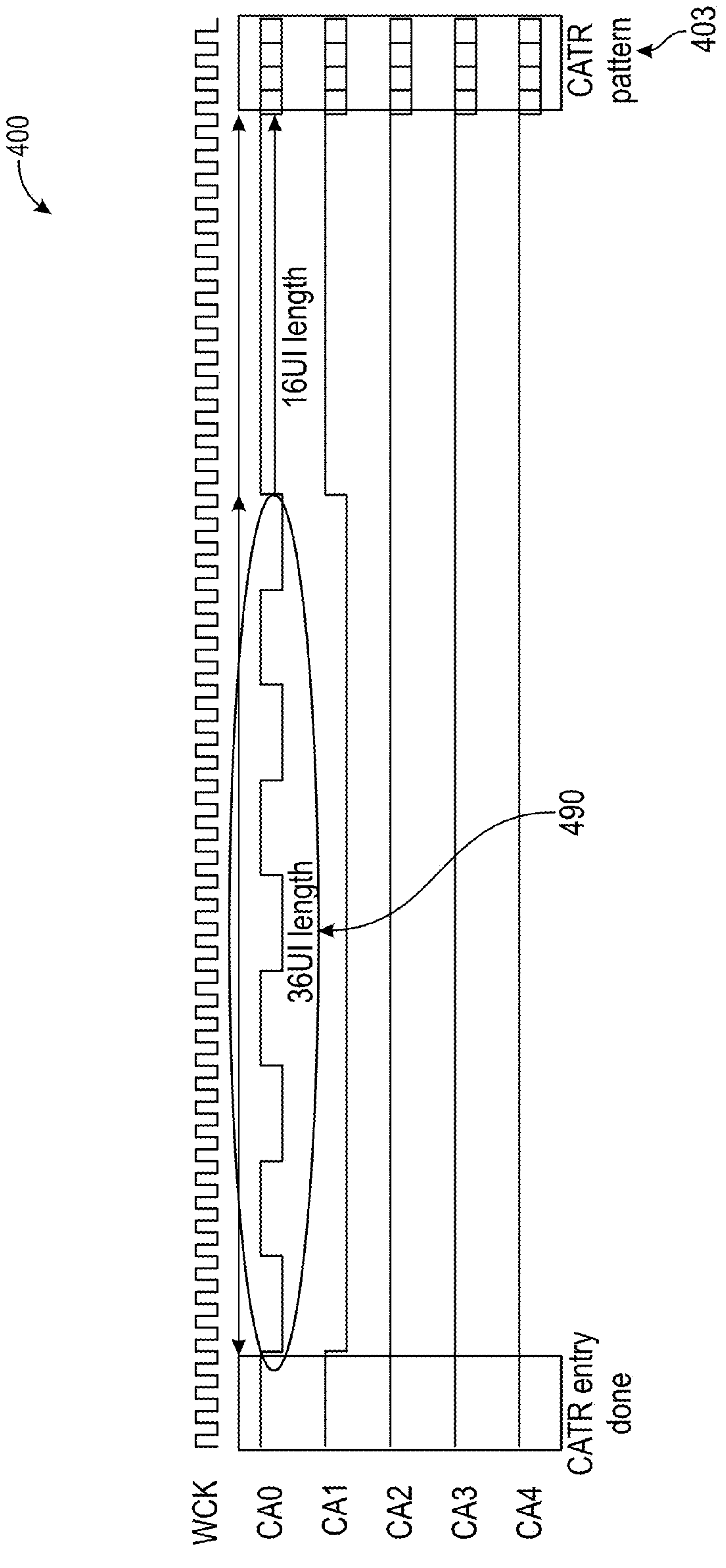
FIG. 4 depicts an example waveforms including a data synchronization pattern that can be received by a sink shown in FIG. 1 according to one or more embodiments of the present disclosure.

FIG. 4 depicts example waveforms 400 including a data synchronization pattern that can be received by the sink 150 shown in FIG. 1, and FIG. 5 depicts example tables 500 corresponding to sequences of bits of the data synchronization pattern 490 shown in FIG. 4. FIG. 4 also depicts input training data 403, which can be communicated through the system 100 after the data synchronization pattern 490.

The input training data 403 is similar to the input training data 203 shown in FIG. 2. The data synchronization pattern 490 can be implemented in the system 100 to identify any unwanted phase shift in the output clock signal 16, remove the positional shift of sampled sequences of data, and remove time shifts to the return data sets. The data synchronization pattern 490 can include a preamble pattern generated by the source 103 and received by the sink 150 via the first CA lane (e.g., "CA0") of the CA bus 120. During the transmission of the data synchronization pattern 490, a second CA lane (e.g., "CA1") is in a low state as depicted.

Referring back to FIG. 1, the data synchronization pattern 490 can be received by the verification module 171 via the buffer 153 and the demultiplexer 165. The data synchronization pattern 490 can include a sequence of bits corresponding to a toggle signal that toggles between 0s and 1s. For example, as depicted in FIG. 4, the data synchronization pattern 490 includes a toggle signal that toggles between four 0s and four 1s for a total length of 36 UIs. However, it should be noted that the data synchronization pattern 490 is not limited to 36 UIs. For example, the data synchronization pattern 490 can have a length greater or less than 36 UIs (e.g., 18 UIs). The data synchronization pattern 490 can also include other data patterns, such as other combinations of 0 and 1 transitions in some cases.

In some cases, the data synchronization pattern 490 received by the verification module 171 can have a sequence of bits that is positionally shifted based at least in part on an unwanted phase shift of the output clock signal 16, as discussed above. An unwanted variation in the phase of the output clock signal 16 can create a variation in the sequence of bits of the data synchronization pattern 490, as received by the verification module 171. Thus, the sequence of bits of the data synchronization pattern 490 received by the verification module 171 can be positionally shifted from a reference point by, for example, one UI, two UIs, three UIs, four UIs, etc., similar to the positional shift in the sequence of bits 330 described above.

FIG. 5 depicts example tables 500 corresponding to sequences of bits of the data synchronization pattern 490 shown in FIG. 4. The tables 500 depict various cases of data sets corresponding to the sequence of bits of the data synchronization pattern 490 that can be received by the verification module 171. The tables 500 include examples in which the sequence of bits is not positionally shifted (i.e., no phase shift of the output clock signal 16) and in which the sequence of bits is positionally shifted (i.e., there exists an unwanted phase shift of the output clock signal 16).

In the first case ("Case 1"), the data synchronization pattern 490 received by the verification module 171 does not have a positional shift, because there is no phase shift of the output clock signal 16 relative to a reference point. In the second case ("Case 2"), the data synchronization pattern 490 received by the verification module 171 includes a positional shift based on a presence of an unwanted phase shift of the output clock signal 16. Compared to that of Case 1, each bit of the sequence in Case 2 is shifted down one UI. In the third case ("Case 3"), the data synchronization pattern 490 received by the verification module 171 includes a positional shift based on a presence of an unwanted phase shift of the output clock signal 16. Compared to that of Case 1, each bit of the sequence in Case 3 is shifted down two UIs. In the fourth case ("Case 4"), the data synchronization pattern 490 received by the verification module 171 includes a positional shift based on a presence of an unwanted phase shift of the output clock signal 16. Compared to that of Case 1, each bit of the sequence in Case 4 is shifted down two UIs.

In the fifth case ("Case 5"), the data synchronization pattern 490 received by the verification module 171 does not include a positional shift, because there is no unwanted phase shift of the output clock signal 16 relative to a reference point. In the sixth case ("Case 6"), the data synchronization pattern 490 received by the verification module 171 includes a positional shift based on a presence of an unwanted phase shift of the output clock signal 16. Compared to that of Case 5, each bit of the sequence in Case 6 is shifted down one UI. In the seventh case ("Case 7"), the data synchronization pattern 490 received by the verification module 171 includes a positional shift based on a presence of an unwanted phase shift of the output clock signal 16. Compared to that of Case 5, each bit of the sequence in Case 7 is shifted down two UIs. In the eighth case ("Case 8"), the data synchronization pattern 490 received by the verification module 171 includes a positional shift based on a presence of an unwanted phase shift of the output clock signal 16. Compared to that of Case 5, each bit of the sequence is shifted down three UIs.

The verification module 171 is configured to determine an extent or quantity of positional shift in the data synchronization pattern 490 that is received. For example, the verification module 171 can be configured to determine that there is no unwanted positional shift if the verification module 171 receives a sequence of bits corresponding to Case 1 or Case 5 (FIG. 5), as an example. However, if the verification module 171 receives a shifted sequence of bits (e.g., such as Cases 2-4 or 6-8), the verification module 171 can determine the quantity of the positional shift based on UI positional differences relative to Case 1 and Case 5. The determined quantity can correspond to a quantity of a phase shift or phase variation of the output clock signal 16 relative to the reference clock signal 12. For example, the quantity of the phase shift or phase variation can be determined based on an extent of the phase shift from the reference point 20.

The verification module 171 can use the determined quantity of positional shift to configure the first delay adjustment module 173, the second delay adjustment module 175, or both the first and second adjustment modules 173 and 175 to remove the positional and time shift effects on return data. In that case, the sampled training data (e.g., the sampled training data 306) can be correctly sampled and mapped to the first and the second DQ lanes, and the return data sets (e.g., the return data sets 320 and 323) can be returned to the source 103 in a correctly synchronized manner relative to the reference clock signal 12.

Figure 6:
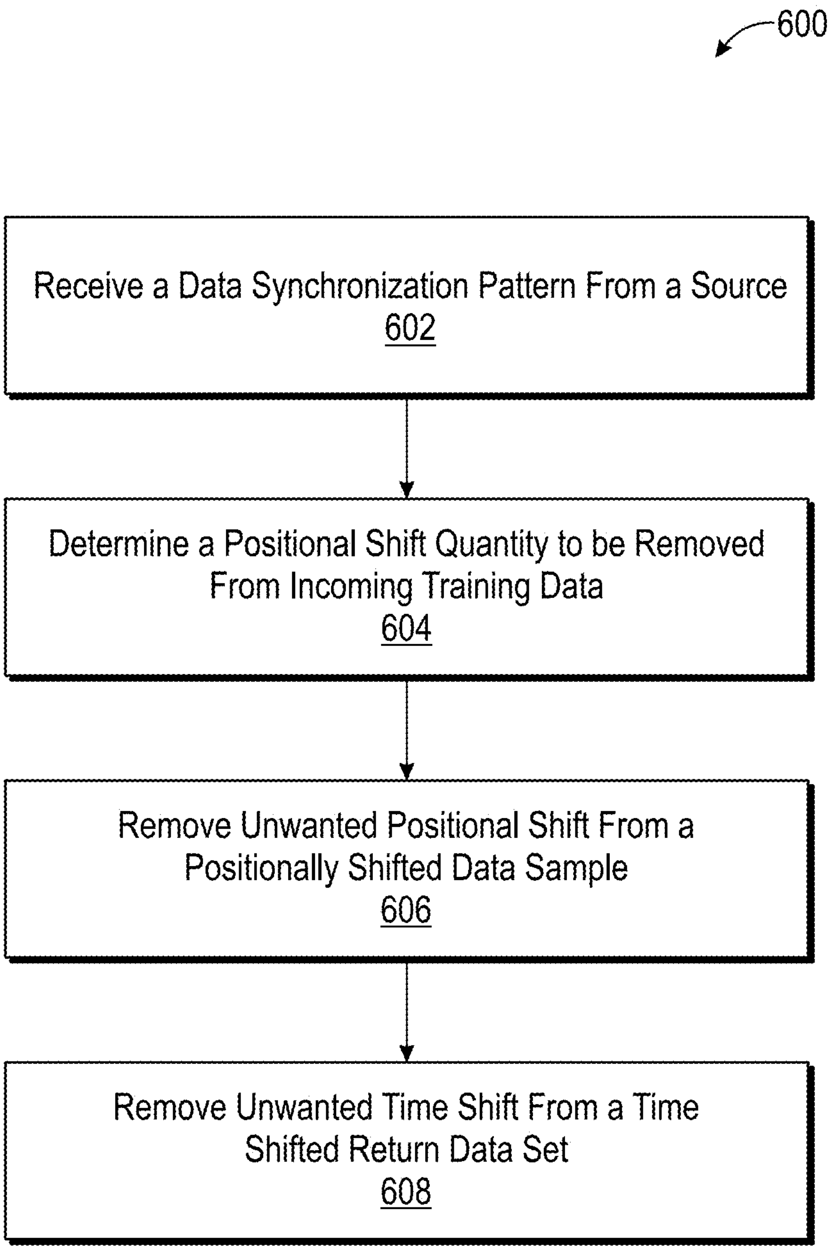
FIG. 6 is a flowchart of a method for data alignment training according to one or more embodiments of the present disclosure.

FIG. 6 is a flowchart of a method 600 for data alignment training according to one or more embodiments of the present disclosure. The method 600 can be performed or conducted by the system 100 shown in FIG. 1 and is described with respect to the waveforms 300, 400, and 500. The method 600 can also be performed by and extended to other systems, however.

At step 602, the method 600 includes a data sink receiving a data synchronization pattern from a source. For example, the sink 150 can receive the data synchronization pattern 490 transmitted from the source 103. The verification module 171 can be configured to receive the data synchronization pattern 490 via the buffer 153 and the demultiplexer 165. The received data synchronization pattern 490 can include a sequence of bits that is positionally shifted based on unwanted phase variations of the output clock signal 16, relative to a reference point. For example, referring back to FIG. 5, the sequences of bits corresponding to Cases 2-4 and 6-8 can correspond to the sequences of bits that are positionally shifted.

At step 604, the method includes the sink determining a positional shift quantity to be removed from an incoming training data set. For example, the verification module 171 in the sink 150 can determine a positional shift quantity to be removed from an incoming training data set based on a positional shift quantity determined from the sequence of bits of the data synchronization pattern 490. As described above, the phase of the output clock signal 16 can be shifted relative to a reference point tied to the reference clock signal 12. For example, the phase of the output clock signal 16 can be shifted from the reference point 20 (see FIG. 3), causing the positional shift of the sequence of bits of the data synchronization pattern 490. Referring back to FIG. 5, the verification module 171 can determine that the quantity of the positional shift associated with the data synchronization pattern 490 corresponds to 1 UI for Case 2 and Case 6, 2 UIs for Case 3 and Case 7, 3 UIs for Case 4 and Case 8, and so forth. Still referring to the example provided in FIG. 3, if the data synchronization pattern 490 was received by the verification module 171 prior to the receipt of the input training data 203 by the sink 150 in FIG. 3, the verification module 171 would have determined that the positional shift quantity to be removed from an incoming training data set is 1 UI.

At step 606, the method 600 includes receiving a positionally shifted data sample and removing the positional shift from the data sample. For example, the first delay adjustment module 173 can receive a positionally shifted data sample (e.g., the sequence of bits 330) and remove the positional shift from the positionally shifted data sample. The positionally shifted data sample can include a first sequence of bits (e.g., the sequence of bits 330) that is positionally shifted by the quantity determined at step 604. For example, as discussed earlier, if the data synchronization pattern 490 was received by the verification module 171 prior to the receipt of the input training data 203 by the sink 150 in FIG. 3, the verification module 171 would have determined that the positional shift quantity to be removed from the sequence of bits 330 is 1 UI.

The first delay adjustment module 173 can be configured to remove the positional shift based on a "shift up" function, which can include shifting to the left (or right) individual bits of the positionally shifted data sample, to generate a position-shift removed sequence of bits. For example, the first delay adjustment module 173 can be configured to apply the "shift up" function to the sequence of bits 330 to remove the one UI positional shift from the sequence of bits 330, thereby generating a position-shift removed sequence of bits. Still referring to the sequence of bits 330, the position-shift removed sequence of bits would include bits "E" through "T," rather than "F" through "U," which would correspond to a correct sampling of the input training data 203 while accounting for the phase variation of the output clock signal 16B.

The data processing unit 177 can be configured to receive and map the position-shift removed sequence of bits to a second data bus (e.g., the DQ data bus 140) and generate a return data set based on the mapping. For example, this mapping can occur in the same manner as described for the mapping of the sequence of bits 330 to the DQ data bus 140 for the generation of the return data sets 320 and 323.

As discussed above, the "shift up" function can remove an unwanted positional shift from the positionally shifted sequence of bits. For example, if the determined positional shift quantity is one UI, then the first delay adjustment module 173 can apply the "shift up" function to remove a one UI positional shift from the positionally shifted sequence of bits, which can include shifting each individual bit of the sequence to the left or to the right by one UI, thus advancing or delaying the sampling process by one UI.

At step 608, the method 600 includes receiving a time shifted return data set and removing a time shift from the time shifted return data set. For example, the second delay adjustment module 175 can receive a time shifted return data set (e.g., the return data sets 320 and 323) and remove the unwanted time shift from the time shifted return data set. The time shifted return data set can correspond to the mapped data sets resulting from the mapping of the position-shift removed sequence of bits to the DQ data bus 140. As described above, although the time shifted return data set now includes a correct mapping based on the positional shift quantity removed from the positionally shifted data sample, the time shifted return data set can still be misaligned for transmission back to the source 103. Referring back to FIGS. 2 and 3, the return data sets 320 and 323 are generated with a time shift of one UI as compared to the return data sets 220 and 223, relative to the reference point 20. To correct this misalignment for the return data sets 320 and 323, the second delay adjustment module 175 would be configured to apply a "shift down" function to the return data sets 320 and 323 to remove the one UI time shift. It should be noted that the "shift down" function is executed as an inverse of the "shift up" function. After the application of the shift down function to remove the unwanted time shift from the time shifted return data set, the second delay adjustment module 175 is configured to transmit the time-shift removed return data set back to the source 103 via the DQ data bus 140 (e.g., using the "DQ0" and "DQ1" bus lanes).

By implementing the embodiments described herein, the source 103 can transmit training pattern data to the sink 150 and receive data back from the sink 150 in a predictable manner that reduces unwanted latency and variations between the source 103 and the sink 150. A data synchronization pattern such as the data synchronization pattern 490 can be relied upon to identify a phase shift of an output clock signal (e.g., the output clock signal 16) of the sink 150 from a reference point. The phase shift can be quantified, and a first delay adjustment module can be configured to remove a positional shift of a positionally shifted data sample associated with training data transmitted from the source 103, thereby enabling the data processing unit 177 to map a correctly sampled sequence of bits to the DQ data bus 140. Additionally, a second delay adjustment module can be configured to remove an unwanted time shift from a time shifted return data set resulting from the mapping of the position-shift removed data sample to the DQ data bus 140 and send a time shift removed return data set back to the source 103.

The concepts described herein can be combined in one or more embodiments in any suitable manner, and the features discussed in the embodiments are interchangeable in some cases. Example embodiments are described herein, although a person of skill in the art will appreciate that the technical solutions and concepts can be practiced in some cases without all of the specific details of each example. Additionally, substitute or equivalent steps, components, materials, and the like may be employed.

The terms "comprising," "including," "having," and the like are synonymous, are used in an open-ended fashion, and do not exclude additional elements, features, acts, operations, and so forth. Also, the term "or" is used in its inclusive sense, and not in its exclusive sense, so that when used, for example, to connect a list of elements, the term "or" means one, some, or all of the elements in the list.

Although relative terms such as "on," "below," "upper," "lower," "top," "bottom," "right," and "left" may be used to describe the relative spatial relationships of certain structural features, these terms are used for convenience only, as a direction in the examples. Thus, if a structure is turned upside down, the "upper" component will become a "lower" component. When a structure or feature is described as being "on" (or formed on) another structure or feature, the structure can be positioned directly on (i.e., contacting) the other structure, without any other structures or features intervening between the structure and the other structure. When a structure or feature is described as being "over" (or formed over) another structure or feature, the structure can be positioned over the other structure, with or without other structures or features intervening between them. When two components are described as being "coupled to" each other, the components can be electrically coupled to each other, with or without other components being electrically coupled and intervening between them. When two components are described as being "directly coupled to" each other, the components can be electrically coupled to each other, without other components being electrically coupled between them.

Terms such as "a," "an," "the," and "said" are used to indicate the presence of one or more elements and components. The terms "comprise," "include," "have," "contain," and their variants are used to be open ended and may include or encompass additional elements, components, etc., in addition to the listed elements, components, etc., unless otherwise specified. The terms "first," "second," etc. may be used as differentiating identifiers of individual or respective components among a group thereof, rather than as a descriptor of a number of the components, unless clearly indicated otherwise.

Combinatorial language, such as "at least one of X, Y, and Z" or "at least one of X, Y, or Z," unless indicated otherwise, is used in general to identify one, a combination of any two, or all three (or more if a larger group is identified) thereof, such as X and only X, Y and only Y, and Z and only Z, the combinations of X and Y, X and Z, and Y and Z, and all of X, Y, and Z. Such combinatorial language is not generally intended to, and unless specified does not, identify or require at least one of X, at least one of Y, and at least one of Z to be included.

The terms "about" and "substantially," unless otherwise defined herein to be associated with a particular range, percentage, or metric of deviation, account for at least some manufacturing tolerances between a theoretical design and a manufactured product or assembly. Such manufacturing tolerances are still contemplated, as one of ordinary skill in the art would appreciate, although "about," "substantially,"

or related terms are not expressly referenced, even in connection with the use of theoretical terms, such as the geometric "perpendicular," "orthogonal," "vertex," "collinear," "coplanar," and other terms.

Although embodiments have been described herein in detail, the descriptions are by way of example. The features of the embodiments described herein are representative and, in alternative embodiments, certain features and elements can be added or omitted. Additionally, modifications to aspects of the embodiments described herein can be made by those skilled in the art without departing from the spirit and scope of the present invention defined in the following claims, the scope of which are to be accorded the broadest interpretation so as to encompass modifications and equivalent structures.

Therefore, the following is claimed:

1. A data sink, comprising:

timing circuitry configured to generate an output clock signal, the output clock signal having a variable phase based at least in part on receipt of a reference clock signal, the reference clock signal transmitted from a source; and a verification module configured to:

receive a data synchronization pattern, the data synchronization pattern comprising a sequence of bits that is positionally shifted based at least in part on the variable phase; and determine a shift quantity to be removed from incoming data for training a data bus, the shift quantity being determined based on the sequence of bits that is positionally shifted.

2. The data sink of claim 1, further comprising a first delay adjustment module, the first delay adjustment module configured to:

receive the incoming data via the data bus, the incoming data comprising a positionally shifted data sample that is positionally shifted based at least in part on the phase of the output clock signal;

remove an unwanted positional shift from the positionally shifted data sample based on the shift quantity; and generate a position-shift removed sequence of bits.

3. The data sink of claim 2, further comprising a data processing unit, the data processing unit configured to:

receive and map the position-shift removed sequence of bits to a second data bus communicatively coupled between the source and the data sink; and generate a return data set based on the mapping, the return data set comprising a time shifted return data set.

4. The data sink of claim 3, further comprising a second delay adjustment module, the second delay adjustment module configured to:

remove an unwanted time shift from the time shifted return data set based on the shift quantity;

generate a time-shift removed return data set; and transmit the time-shift removed return data set back to the source via the second data bus.

5. The data sink of claim 3, wherein:

the data bus is a command address (CA) bus comprising a plurality of CA lanes; and the second data bus is a data queue (DQ) bus comprising a plurality of DQ lanes.

6. The data sink of claim 5, wherein to map the position-shift removed sequence of bits to the second data bus, the data processing unit is further configured to map a first CA lane of the plurality of CA lanes to a first DQ lane and a second DQ lane of the plurality of DQ lanes.

7. The data sink of claim 6, wherein the data synchronization pattern is a preamble pattern comprising a toggle signal for identifying an unwanted phase shift of the phase of the output clock signal.

8. The data sink of claim 7, wherein the toggle signal comprises a predefined sequence of bits that extends for a predefined unit interval (UI) length transmitted via a first CA bus lane.

9. The data sink of claim 8, wherein the plurality of CA lanes comprises a second CA lane, the second CA lane being in a low state during transmission of the toggle signal.

10. The data sink of claim 8, wherein the predefined UI length extends between a length of 20 UIs and a length of 40 UIs.

11. The data sink of claim 8, wherein the predefined UI length is 36 UIs with a 4 UI toggle pattern.

12. The data sink of claim 5, wherein:

the CA bus is a 5-bit bus and the DQ bus is a 10-bit bus; and an individual CA bus lane of the plurality of CA lanes is mapped to at least two DQ bus lanes of the plurality of DQ lanes at a 1:2 ratio.

13. The data sink of claim 1, wherein:

the timing circuitry comprises a phase-locked loop (PLL) clock generator and a clock divider;

the PLL clock generator is configured to generate a PLL clock signal based on receipt of the reference clock signal; and the clock divider is configured to generate the output clock signal based on receipt of the PLL clock signal.

14. The data sink of claim 13, wherein the variable phase of the output clock signal further varies based at least in part on a lock of the PLL clock signal to the reference clock signal.

15. A system, comprising:

a source configured to generate a reference clock signal;

a sink comprising:

timing circuitry configured to generate an output clock signal based at least in part on receipt of the reference clock signal; and a verification module configured to:

receive a data synchronization pattern transmitted from the source, the data synchronization pattern comprising a sequence of bits that is positionally shifted based at least in part on a phase of the output clock signal; and determine a shift quantity to be removed from incoming data for training a data bus, the shift quantity being determined based on the sequence of bits that is positionally shifted.

16. The system of claim 15, wherein the sink further comprises:

a first delay adjustment module configured to:

receive the incoming data via the data bus, the incoming data comprising a positionally shifted data sample that is positionally shifted based at least in part on the phase of the output clock signal;

remove an unwanted positional shift from the positionally shifted data sample based on the shift quantity; and generate a position-shift removed sequence of bits;

a data processing unit configured to:

receive and map the position-shift removed sequence of bits to a second data bus; and generate a return data set based on the mapping, the return data set comprising a time shifted return data set; and a second delay adjustment module configured to:

remove an unwanted time shift from the time shifted return data set based on the shift quantity;

generate a time-shift removed return data set; and transmit the time-shift removed return data set back to the source via the second data bus.

17. The system of claim 16, wherein to map the position-shift removed sequence of bits to the second data bus, the data processing unit is further configured to map a first CA lane of a plurality of CA lanes to a first DQ lane and a second DQ bus lane of a plurality of DQ lanes.

18. The system of claim 16, wherein:

to remove the unwanted positional shift from the positionally shifted data sample based on the shift quantity, the first delay adjustment module is further configured to apply a shift up function to the positionally shifted data sample; and to remove the unwanted time shift from the time shifted return data set based on the shift quantity, the second delay adjustment module is further configured to apply a shift down function to the time shifted return data set.

19. A system, comprising:

timing circuitry configured to generate an output clock signal, the output clock signal having a variable phase;

a verification module configured to:

receive a data synchronization pattern, the data synchronization pattern comprising a sequence of bits that is positionally shifted based at least in part on the variable phase; and determine a shift quantity to be removed from incoming data for training a data bus, the shift quantity being determined based on the sequence of bits that is positionally shifted; and a first delay adjustment module configured to:

receive the incoming data via the data bus, the incoming data comprising a positionally shifted data sample that is positionally shifted based at least in part on the phase of the output clock signal;

remove an unwanted positional shift from the positionally shifted data sample based on the shift quantity; and generate a position-shift removed sequence of bits.

20. The system of claim 19, further comprising:

a data processing unit configured to:

receive and map the position-shift removed sequence of bits to a second data bus; and generate a return data set based on the mapping, the return data set comprising a time shifted return data set; and a second delay adjustment module configured to:

remove an unwanted time shift from the time shifted return data set based on the shift quantity;

generate a time-shift removed return data set; and transmit the time-shift removed return data set back to a source via the second data bus, wherein:

to remove the unwanted positional shift from the positionally shifted data sample based on the shift quantity, the first delay adjustment module is further configured to apply a shift up function to the positionally shifted data sample; and to remove the unwanted time shift from the time shifted return data set based on the shift quantity, the second delay adjustment module is further configured to apply a shift down function to the time shifted return data set.

* * * * *